UNITED STATES PATENT OFFICE.

HEINRICH SCHROER, OF DUSSELDORF, GERMANY, ASSIGNOR TO CARL GOSSWEILER, OF OLTEN, SWITZERLAND.

LIQUID FOR CLEANING GLASS.

1,077,860.   Specification of Letters Patent.   Patented Nov. 4, 1913.

No Drawing.   Application filed January 15, 1913.   Serial No. 742,213.

*To all whom it may concern:*

Be it known that I, HEINRICH SCHROER, civil engineer, a subject of the Emperor of Germany, residing at 80 Graf Adolfstrasse, Dusseldorf, Germany, have invented new and useful Improvements in Liquid for Cleaning Glass and the like, of which the following is a specification.

The glass roofs of factories, railway stations or other buildings which have become covered with dust, soot, grease and the like are usually cleaned at the present time by means of sulfuric acid, hydrochloric acid, soda lye, caustic soda or the like. This method of cleaning not only takes up much time but is dangerous to the persons who carry it out, as the aforesaid substances are liable to cause injuries to the hands of said persons. These substances also attack the putty-filled grooves, metal mountings, roof gutters, coverings, etc., so in a short time lead to leakages. All disadvantages resulting from cleaning with these known agents are entirely obviated by the use of the liquid produced according to the present invention.

The improved cleaning agent contains in addition to sulfuric acid and aqueous extracts of plants containing saponin, such as quillaia or the like, also copper sulfate for the purpose of coating any existing metal parts, putty filled joints, coverings, etc., with a protecting agent.

The use of sulfuric acid for cleaning dirty glass is known. It is also known to employ aqueous extracts of plants containing saponin such as quillaia or the like in a manner similar to soap as a lather producing agent, but I am not aware that a mixture of sulfuric acid and saponin, such as quillaia or the like, has ever been used as a detergent. Nor am I aware that extracts of plants containing saponin have been used for cleaning glass.

The manufacture of, for instance, one hundred liters of my detergent, is accomplished as follows: About one and one-half kilograms of quillaia are boiled in water until the latter turns a dark brown color. To the cold decoction are then added about five liters arsenic-free 66% sulfuric acid and about twenty grams copper sulfate. The addition of sulfuric acid to the decoction of quillaia greatly increases the effectiveness of the mixture and enables it to act so intensely upon dirt that the latter may be easily rubbed and washed from the glass. A decoction of quillaia with sulfuric acid alone is, however, not quite satisfactory for cleaning purposes, since it is incapable of coating the various parts with a protecting agent. In order therefore to obtain such protection copper sulfate is added to the mixture and the action of which is that the metals, putty filled joints, etc., brought into contact with the liquid receive a slight coating of copper or copper sulfate which is deposited thereon during evaporation which form a protective coating therefor.

This liquid has an intensely powerful solvent action on dirt, and keeps moist for an extraordinary length of time. This degree of moisture of the layer of dirt coated with the liquid also permits of cleaning being carried out during great heat whereas the use of hydrochloric acid, caustic soda or the like would result in their drying immediately. By the removal of the layer of dirt treated with the liquid forming the subject matter of the application there is produced upon the glass a polish which renders any speedy recovering thereof with dust, soot, grease, etc., impossible, quite a contrary result to that produced by hydrochloric acid, caustic soda or the like, which leave a film of grease upon the glass which retains the particles of dust and soot falling thereon and thereby brings about a speedy soiling of the glass. The polish obtained by means of the present liquid however completely precludes any immediate fresh adhesion of the dirt.

A further advantage in comparison with the present method of cleaning is that without water and therefore without subsequent rinsing the glass surfaces can be cleaned and that instead of 50 to 60 square meters of glass roof being cleaned by the known substances 300 to 400 square meters can be cleaned by the use of the liquid herein described.

I claim:—

1. The herein described composition of matter for cleaning glass and the like, consisting of sulfuric acid, aqueous extracts of plants containing saponin, and copper sulfate, substantially as described.

2. The herein described composition for cleaning glass or the like, consisting of sulfuric acid, quillaia extract, and copper sulfate, substantially as described.

In testimony whereof I have signed my name to this specification in the presence of two subscribing witnesses.

HEINRICH SCHROER.

Witnesses:
 BESSIE F. DUNLAP,
 GERTRUDE SCHÖEFER.